(12) United States Patent
Luu (10) Patent No.: US 6,978,940 B2
(45) Date of Patent: Dec. 27, 2005

(54) CONTACTLESS SIM CARD CARRIER WITH DETACHABLE ANTENNA AND CARRIER THEREFOR

(75) Inventor: Daniel V. H. Luu, Irving, TX (US)

(73) Assignee: Quadnovation, Inc., Irving, TX (US)

( * ) Notice: Subject to any disclaimer, the term of this patent is extended or adjusted under 35 U.S.C. 154(b) by 0 days.

(21) Appl. No.: 10/739,013

(22) Filed: Dec. 19, 2003

(65) Prior Publication Data

US 2004/0129785 A1 Jul. 8, 2004

Related U.S. Application Data

(62) Division of application No. 10/150,088, filed on May 20, 2002, now abandoned.

(60) Provisional application No. 60/330,979, filed on Nov. 6, 2001.

(51) Int. Cl.[7] .............................................. G06K 7/00
(52) U.S. Cl. ..................................... 235/486; 235/485
(58) Field of Search ....................... 235/492, 380–381, 235/486; 455/407, 556, 558, 567, 128–129; 343/751, 767

(56) References Cited

U.S. PATENT DOCUMENTS

| | | | |
|---|---|---|---|
| 5,206,495 A | | 4/1993 | Kreft |
| 5,608,606 A | * | 3/1997 | Blaney ........................ 361/686 |
| 5,729,591 A | * | 3/1998 | Bailey ......................... 455/558 |
| 5,773,812 A | | 6/1998 | Kreft |
| 5,809,633 A | | 9/1998 | Mundigl et al. |
| 5,979,771 A | * | 11/1999 | Adams et al. ............... 235/486 |
| 6,045,043 A | | 4/2000 | Bashan et al. |
| 6,062,887 A | * | 5/2000 | Schuster et al. ............ 439/218 |
| 6,095,423 A | | 8/2000 | Houdeau et al. |
| 6,168,083 B1 | | 1/2001 | Berger et al. |
| 6,178,335 B1 | * | 1/2001 | Vu ............................... 455/558 |
| 6,264,506 B1 | * | 7/2001 | Yasufuku et al. ........... 439/638 |
| 6,288,904 B1 | | 9/2001 | Houdeau et al. |
| 6,308,894 B1 | * | 10/2001 | Hirai et al. .................. 235/492 |
| 6,641,049 B2 | * | 11/2003 | Luu ............................. 235/492 |
| 2002/0114130 A1 | * | 8/2002 | Schremmer et al. ........ 361/683 |

FOREIGN PATENT DOCUMENTS

| | | |
|---|---|---|
| DE | 19646 717 A | 5/1998 |
| DE | 198 26 428 A | 12/1999 |
| DE | 199 10 768 A | 9/2000 |
| EP | 0 820 178 A | 1/1998 |
| GB | 2 358 991 A | 8/2001 |
| JP | 2001 160126 A | 6/2001 |

\* cited by examiner

*Primary Examiner*—Diane I. Lee
(74) *Attorney, Agent, or Firm*—Dickstein Shapiro Morin & Oshinsky LLP (57) ABSTRACT

A contactless transaction card is detachably connectable to an antenna provided on a flexible film having an adhesive coating or other carrier surface. An integrated circuit chip on the contactless transaction card includes leads for establishing an electrical connection with the ends of the antenna. The contactless transaction card and detachable antenna may be provided on a carrier card with the adhesive film adhered onto the card and the contactless transaction card either die cut into the carrier card or frictionally held in a recessed holder formed in the carrier card surface. In a preferred embodiment, a cover for a mobile telephone includes a holder for a contactless transaction card. An antenna may be either adhered onto the cover by the user or may be permanently provided on the surface of the cover. The holder is configured so that when a contactless transaction card is inserted into the holder, the leads of the integrated circuit is facing the surface of the cover to enable electrical connection to be established between the contactless transaction card and the antenna.

13 Claims, 8 Drawing Sheets

CONTACTLESS SIM CARD CARRIER WITH DETACHABLE ANTENNA AND CARRIER THEREFOR

This application is a divisional of U.S. patent application Ser. No. 10/150,088, filed May 20, 2002 now abandoned, which claims the benefit of Provisional Application No. 60/330,979, filed Nov. 6, 2001, the entire disclosures of both applications being hereby incorporated by reference.

BACKGROUND OF THE INVENTION

1. Field of the Invention

The present invention relates to contactless electronic information storage cards and carriers therefor in which the contactless card can be stored, carried, and/or used in a convenient manner.

2. Brief Description of the Related Art

The use of integrated circuit cards containing user or account specific information for various purposes is becoming more and more common in today's modern society marked by increasingly advancing technology and the corresponding demand for greater convenience and faster transactions.

One example of an integrated circuit card is known as a subscriber identity module (SIM) card. SIM cards are most commonly used, primarily in Europe and Asia, in communication devices such as mobile telephones to enable a user to access an individual account or a particular wireless telephone network in a specific country. Each SIM card contains the configuration information for a designated network, and also contains information identifying the user, such as the user's mobile telephone number, and related account information.

SIM cards, like most integrated circuit cards, are typically made of plastic and have an integrated circuit (IC) semiconductor chip mounted or embedded therein, to provide a connection interface on the surface of the card at the location of the integrated circuit. Moreover, SIM cards are generally provided in one of two sizes, i.e., a full-sized or ISO-sized card, and a micro or plug-in sized card. The full-sized card is approximately the size of a standard credit card, while the plug-in sized card is approximately 25 mm long and 15 mm wide, and less than 1 mm thick.

To ensure correct orientation of a plug-in sized SIM card upon insertion in the mobile phone, one corner of the otherwise rectangular card is cut at an angle, so that the length of one edge of the card is reduced to about 21 mm while the width of the adjacent edge is reduced to about 12 mm. The card can only be inserted into the phone with the angled corner in the correct orientation.

When inserted into the telephone, electrical contacts formed on the integrated circuit embedded in the card become aligned with and are placed in contact with a corresponding set of contacts on the interfacing surface of the telephone, thereby establishing an electrical connection to the internal circuitry of the mobile phone. In this manner, the mobile phone is enabled to access information from the identification/memory card.

Figure 1:
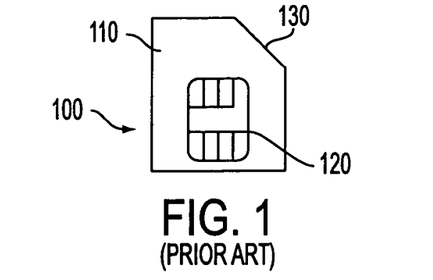
FIG. 1 shows a plug-in sized SIM card as known in the prior art.

FIG. 1 shows a plug-in sized SIM card 100 having a card body 110, an integrated circuit chip 120 mounted therein on one surface thereof, and an angled corner 130 for guiding the user as to the correct orientation of the card upon insertion of the card into an appropriate electronic device. As mentioned above, any information stored in the integrated circuit can only be accessed when the SIM card is placed so that the IC 120 is in direct physical contact with the appropriate contact elements on the electronic device in which the SIM card is used.

A second type of integrated circuit card is a contactless transaction card, commonly used in public transportation systems or security/access control. Similarly to a SIM card, the integrated circuit in a contactless transaction card may store information specific to a user such as account information or user identification information. On the other hand, while a SIM card requires physical contact of the contacts of the IC with the device accessing the information stored in the IC, a contactless transaction card transmits and receives information from and to a reader and/or writer device without requiring physical contact of the card with the reader and/or writer device.

Figure 2:
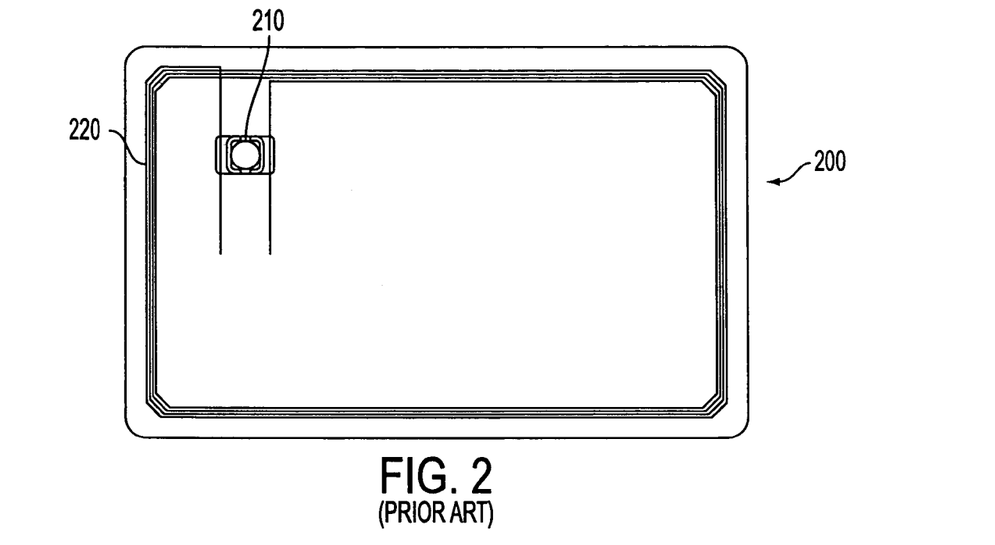
FIG. 2 shows a contactless transaction-type IC card as known in the prior art.

As shown in FIG. 2, a contactless transaction card 200 includes an integrated circuit having an antenna 220 extending therefrom and embedded inside the material or layers forming the card. The antenna has a relatively long total length with respect to the IC, and is typically incorporated onto the card by being looped or wound in a pattern in a plane of the card. The transfer or reading of information to or from a contactless transaction card is achieved by sending RF signals through the antenna extending from the integrated circuit. The length of the antenna corresponds to the transmission and reception range thereof, so that the longer the antenna, the greater the distance away from the reader/writer device the card can be held to successfully transfer or access information between the card and the reader/writer device.

In an example of use of a contactless transaction card in which a user desires to gain access to a secured location, the user simply brings the contactless transaction card close to a card reader within a range appropriate for the antenna, whereupon the reader is enabled to read the identification data contained in the IC via the antenna embedded in the card. If the reader determines that the user, based on the identification information obtained by the reader, is authorized to access the secured location, the reader sends a signal to control the security system to enable the user to access the secured location.

When a contactless transaction card is used in a transportation system, for example, the IC mounted in the card contains the user's account information, such as an available balance (for a declining balance type of arrangement), or billing information (for a credit type of arrangement). The manner of operation for using the card to enter or exit the transportation system or to access or update the user's account is similar to the operation for access control, in that the card is simply brought towards the card reader within the readable range of the antenna.

Contactless transaction cards provide several advantages over the standard integrated circuit (contact-type) cards, such as faster transaction times, ease of use, and less wear and tear on the cards and the data reading and writing devices.

Figure 3:
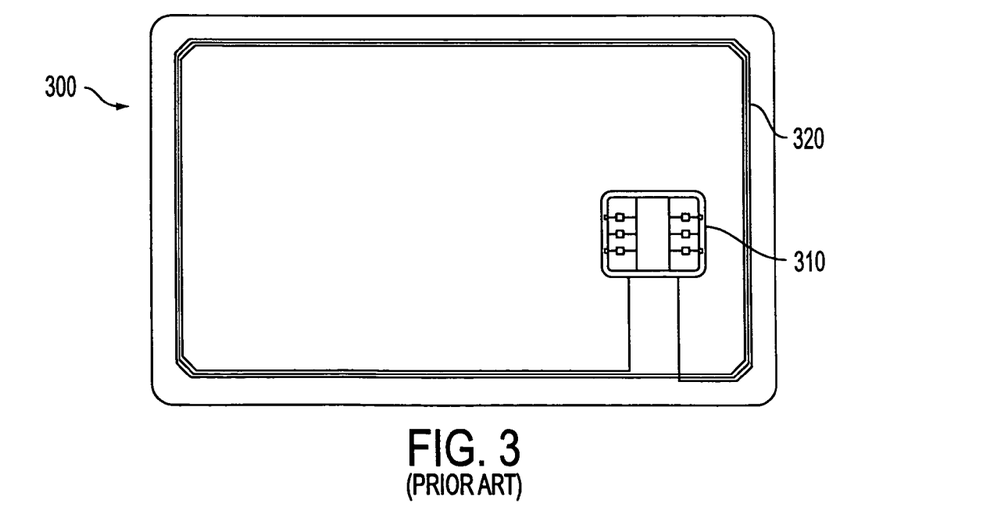
FIG. 3 shows a dual-interface IC card as known in the prior art.

A dual-interface card, such as that disclosed in U.S. Pat. No. 6,168,083, combines the features of both a contact-type and contactless transaction card into one integrated circuit. As shown in FIG. 3, for example, a dual-interface card 300 includes an IC 310 which has electrical contacts for contact-type data transfer, and also includes an antenna 320 connected to the IC 310 for contactless data transfer.

Currently, contactless transaction cards and dual-interface cards are provided in the form of credit card-sized or the full-sized ISO cards, and are carried in a person's wallet, purse, briefcase, pocket, etc. A problem with storing and carrying such cards is that they may be easily misplaced, damaged, or, at a minimum, hard to find if stored with a collection of other small and/or bulky items in a user's pocket, purse, bag, etc. Also, especially if a person is also carrying a mobile telephone, a laptop computer, a personal digital assistant, and/or other items, it is often inconvenient for the user to have to rummage through his or her belongings to find the card when needed. It would thus be desirable to provide a contactless transaction card in a size which is easily and conveniently stored in a designated holder.

SUMMARY OF THE INVENTION

A first aspect of the present invention provides a contactless transaction module and an antenna which is separable therefrom and reconnectable therewith.

A second aspect of the present invention provides a plug-in sized contactless transaction module.

A third aspect of the present invention provides a plug-in sized contactless transaction module detachably carried on a full-sized or credit card-sized carrier card.

A fourth aspect of the present invention provides an antenna which is connectable to an integrated circuit (IC) chip which enables contactless data transfer for access control or transactional applications, and which is removably mounted on a carrier surface and re-mountable on another surface.

A fifth aspect of the present invention provides a carrier in which a plug-in sized contactless transaction module can be conveniently carried in the housing of a portable electronic device such as a mobile communication device, and to which a detachable antenna can be affixed to enable the chip module to operatively engage in contactless transactions.

The contactless transaction module of the present invention includes an IC chip provided on a plug-in sized chip module and which has a connection interface for being aligned with an antenna to enable the conatactless operation of the chip module. The present invention also includes an antenna associated with the chip module having a corresponding connection interface for mating with the connection interface of the IC chip. The antenna can be provided on the surface of a carrier configured to hold a plug-in sized contactless transaction module, or can be provided on a film or film laminate which may be affixed to a desired surface and interfaced with the contactless transaction module.

In a preferred embodiment of a carrier for operatively holding the contactless transaction module, the carrier is formed as a detachable cover for the housing or battery pack of a mobile telephone. For example, the cover may be formed as a snap-on or slidably detachable cover over the back surface of a mobile telephone or the battery pack thereof. The carrier preferably includes an antenna provided on the inwardly-facing surface of the detachable cover, and a holder for a plug-in sized contactless transaction module on the same surface. The antenna and the holder are mutually positioned so that the connection interface of the antenna is aligned with the connection interface of a contactless transaction module placed in the holder. Using such a carrier in accordance with the invention, a plug-in sized contactless transaction module is operatively enabled and is also protected and hidden from view when the cover is attached to the mobile telephone.

Other features and advantages of the present invention will become apparent from the following description of the invention which refers to the accompanying drawings.

DETAILED DESCRIPTION OF THE INVENTION

Figure 4A:
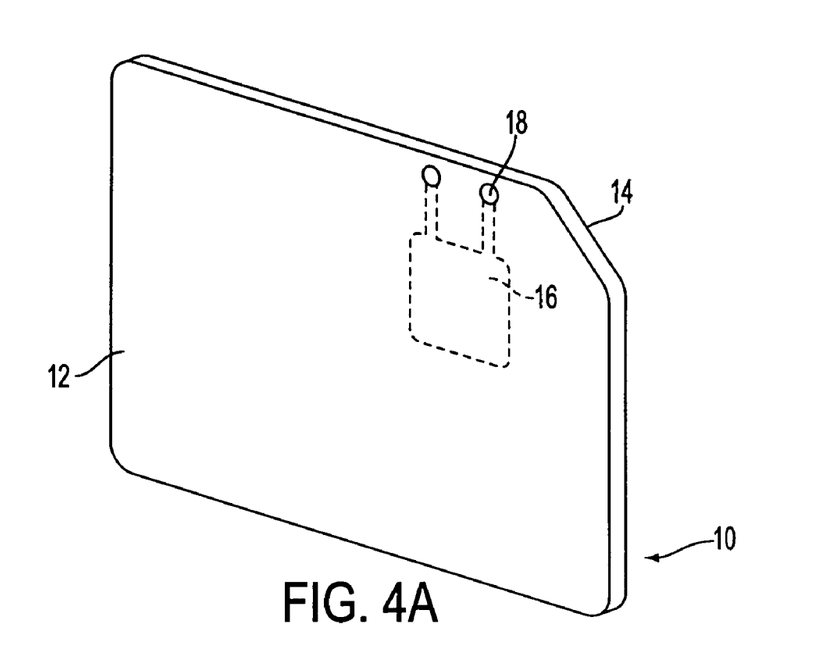
FIG. 4A shows an integrated circuit chip having an antenna connection leads for contactless data transmission provided on one surface of a plug-in sized module.
Figure 4B:
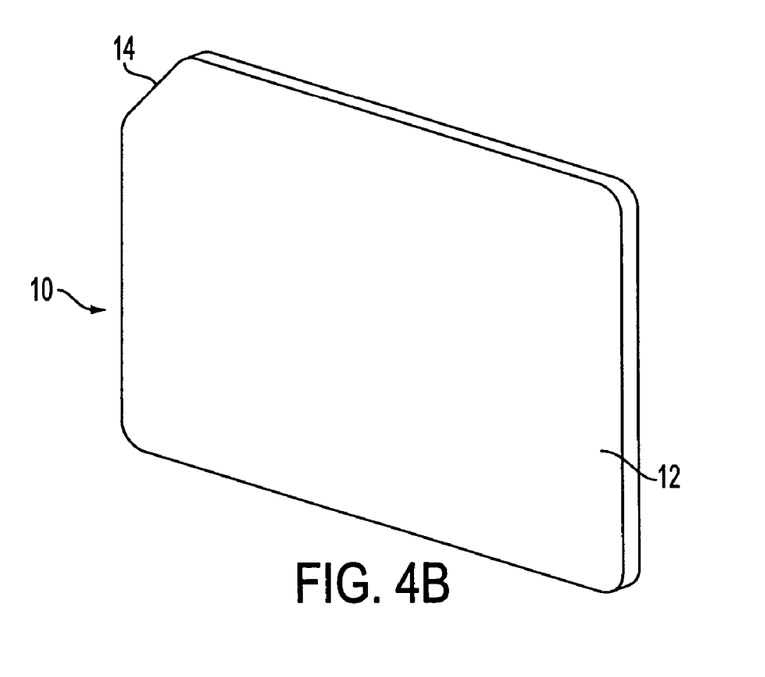
FIG. 4B shows the surface of the plug-in sized contactless transaction module opposite to the surface shown in FIG. 4A.

FIGS. 4A and 4B illustrate an example of a contactless transaction module 10 in accordance with the present invention, in which an integrated circuit (IC) 16 is embedded in one surface of a substrate forming a module body 12. The substrate may be a card made from a plastic material similar to those used in credit cards or other types of transaction cards, or may be made as a composite film laminate. In a preferred embodiment of the present invention, the size and shape of module body 12 is the same as those of a standard plug-in sized SIM card. In particular, module body 12 has an angled corner 14 for guiding insertion of the module into a holder in the proper position. Alternatively, however, module body 12 may be formed with another type of asymmetrical shape for indicating a proper orientation, or according to any other compact or convenient size and shape.

Integrated circuit 16 includes leads 18 for establishing a connection with an antenna, so that electromagnetic signals, preferably RE signals, can be transmitted to and from IC 16. Due to the ability of IC 16 to communicate with a reader or writer device via the transmission or reception of electromagnetic signals through the ambient air using the antenna, IC 16 does not have to be placed in direct physical contact with the device reading or controlling the information being transferred to or from the IC. In this manner, IC 16 differs from IC 120 in FIG. 1 in that IC 120 transmits and receives information in the form of electrical currents directly from the reader or controlling device, and is thus required to establish direct physical and electrical contact with any device reading or writing information to the IC 120.

Figure 5:
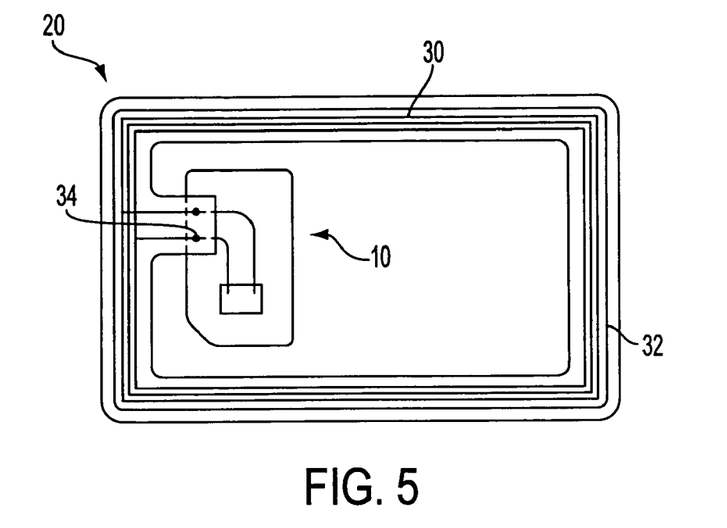
FIG. 5 illustrates a plug-in sized contactless transaction module and an antenna which is separable therefrom both provided on a full-sized carrier card.
Figure 5A:
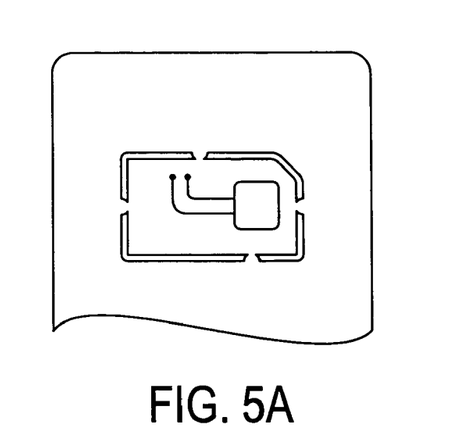
FIG. 5A illustrates a first arrangement in which a plug-in sized contactless transaction module is provided on the full-sized carrier card.

The contactless transaction module 10 may be detachably provided on a carrier card 20 having dimensions substantially similar to a full-sized ISO SIM card, a credit card, or other conveniently sized card, as illustrated in FIG. 5. Carrier card 20 may be formed of a plastic material or laminate, which may or may not be the same material(s) used to form module body 12, or may be made of any other material having sufficient rigidity to support a contactless transaction module 10 being mounted or affixed thereto. In one example of a carrier card 20, the plug-in sized contactless transaction module 10 may be die cut into the substrate material forming carrier card 20, as shown in FIG. 5A, so that the plug-in sized module can be easily punched out and removed from the carrier card if desired.

Figure 5B:
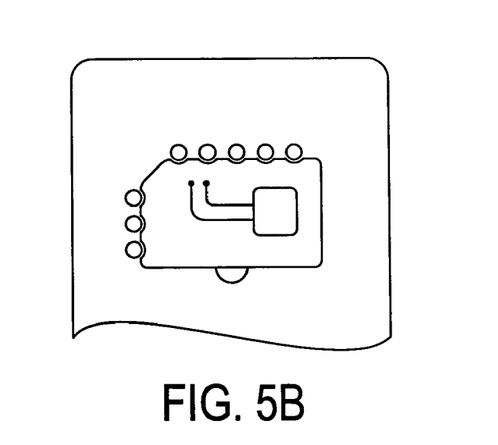
FIG. 5B illustrates the second arrangement of a plug-in sized contactless transaction module on the full-sized card.

Alternatively, carrier card 20' may be formed with one or more recessed holder(s) 22 on one side thereof. Recessed holder 22 is sized and shaped to substantially correspond to the size and shape of contactless transaction module 10. As can be seen more clearly in FIG. 5B, recessed holder 22 has a depth equal to that of the contactless transaction module 10 so that the upper surface of a module 10 inserted into holder 22 will lie flush with the upper surface of carrier card 20'. In this example shown in FIGS. 5, 5A and 5B, the holder 22 and the module 10 are sized and shaped similarly to that of a plug-in sized SIM card. As mentioned above, however, module 10 can be provided in any size and/or shape, whereupon holder 22 is correspondingly configured.

Figure 6A:
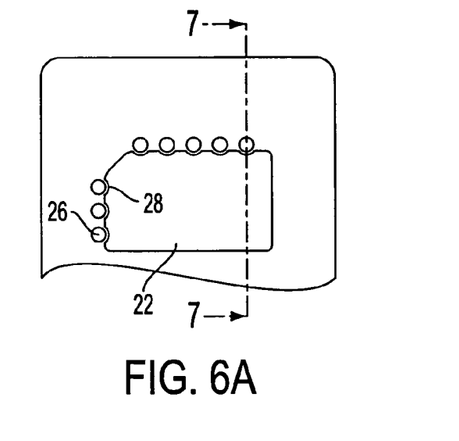
FIGS. 6A and 6B illustrates first and second variations of a holder for a plug-in sized contactless transaction module in a carrier card in accordance with the second arrangement shown in FIG. 5B.
Figure 7:
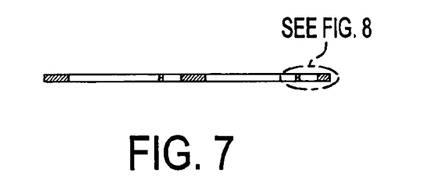
FIG. 7 is a cross-sectional view of the holder across line A—A in FIG. 6.
Figure 8:
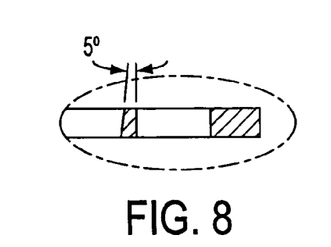
FIG. 8 is an enlarged view of the encircled region in FIG. 7.

Referring now to FIG. 6A, a plurality of holes or craters 26 are formed in carrier card 20 along at least one side of the perimeter of recessed holder 22 and preferably along two sides. The craters 26 are separated from recessed holder 22 by spring elements 28, as best seen in FIG. 8 showing an enlarged view of the encircled portion of the partial cross-section of carrier card 20 shown in FIG. 7.

Spring elements 28 are preferably formed from the same material from which carrier card 20 is made, and are thus continuous with the walls defining recessed holder 22. Spring elements 28 are biased inwardly toward the center of recessed holder 22 and function similarly to leaf springs. Preferably, the surface of each spring element 28 which faces towards and contacts a card inserted into holder 22 is slightly angled away from the center of holder 22 relative to the vertical direction, e.g., approximately 5°. When a contactless transaction module 10 is provided in recessed holder 22, the surfaces of spring elements 28 which are angled at approximately 5° in their relaxed state are pushed outwardly to accommodate the edges of module 10. In this state, the spring elements 28 are held in tension against the module 10 to thereby securely hold the module 10 in place in the holder 22.

Figure 6B:
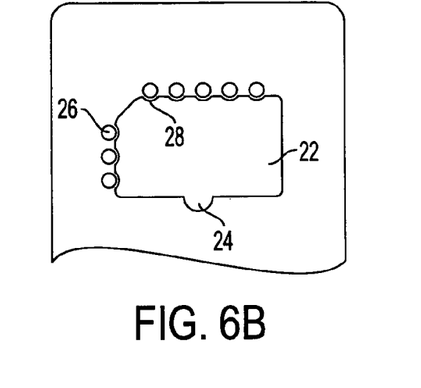

Contactless transaction module 10 may be removed from carrier card 20' by flexing the carrier card 20' to pop the module 10 out of the recessed holder 22. Alternatively, carrier card 20' may include a notch 28 formed extending from one side of recessed holder 22 FIG. 6B, for facilitating removal of module 10 from the holder 22. In this configuration, notch 28 is at least as deep as, and may be slightly deeper than recessed holder 22, so that a user can catch the edge of the module 10 with his or her finger or other removal tool, to thereby pop the module 10 out of holder 22.

Using carrier card 20' as described above with reference to FIGS. 5B and 6–8, contactless transaction module 10 may be reinserted into holder 22, if desired, by aligning module 10 over the corresponding shape of recessed holder 22 and applying pressure the card, pushing it against the holder 22. The pressure exerted on module 10 and hence the angled face of spring elements 28 causes the spring elements to flex outwardly away from module 10, whereupon module 10 is then snapped into place in holder 22. When module 10 is inserted into recessed holder 22, therefore, spring elements 28 are held in tension against module 10 to securely hold it in holder 22.

Without the angled face on the spring elements (in the relaxed state), upon inserting module 10 into holder 22, spring elements 28 would not be pushed outwardly to accept the module 10 into the holder. Instead, the edge of module 10 would bear down directly onto the top surfaces of spring elements 28, because the relaxed dimensions of holder 22 are slightly smaller than the dimensions of module 10.

Other alternative means by which a contactless transaction module may be mounted or secured to a carrier card include forming a tongue and groove arrangement around the respective peripheral surfaces of the module and a recessed holder in the carrier card, other mating protrusion and indentation arrangements formed along the peripheral surfaces or opposing major surfaces of the module and carrier card, and an adhesive applied on the major surface of module 10 opposite that on which the IC 16 is located which enables the module to be repeatedly adhered to and removed from a supporting surface.

Figure 9:
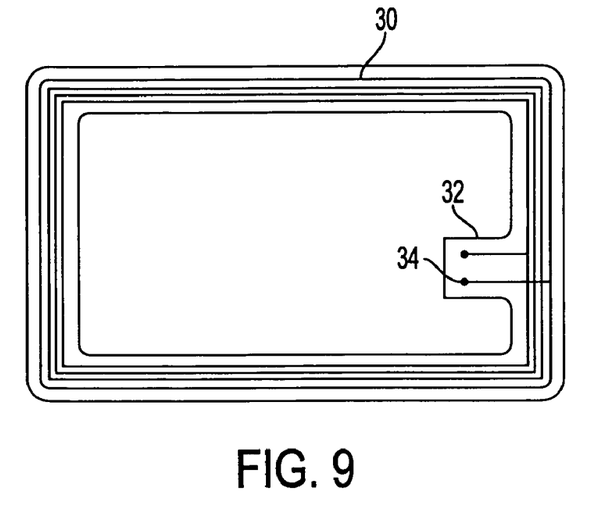
FIG. 9 illustrates an antenna for the plug-in sized contactless transaction module formed on a film and separated from the chip module.

FIG. 9 shows an antenna 30 for transmitting RF signals to and from IC 16 on a contactless transaction module 10. Antenna 30 typically (although not necessarily) has a total length several times that of the carrier card 20, 20', and is therefore coiled or looped around the planar area of a flexible support film 32, with the ends 34 of the antenna 30 positioned so as to be able to both be aligned with leads 18 of IC 16 on contactless transaction module 10.

Support film 32 may be formed as a multi-layered film or a film laminate with antenna 30 being embedded within or sandwiched between the layers of the film. Alternatively, the film may be formed as a single layer with antenna 30 provided on the surface of the film.

Antenna 30 may be formed on or in the film 32 in several ways. For example, antenna 30 can be simply provided as a length of a filament or wire. Alternatively, antenna 30 can be formed as a continuous line of a conductive ink, which may be deposited on the film 32 by printing. A third alternative for forming antenna 30 is by depositing or coating a layer of conductive material onto the film by any known method, and then using a lithographic process to etch away the inverse image of the antenna, so that all of the conductive material is removed from the film except for a continuous strip of the conductive material forming the antenna. As mentioned above, the antenna as provided by any of these alternatives can be located between layers of a multi-layer film or a film laminate, or on the surface of a single layer film, a multi-layer film or a film laminate.

An adhesive is applied to one surface of film 32 which enables the film to be removed or peeled away from a supporting surface. Preferably, the adhesive is reusable so that the film can withstand being firmly affixed to and removed from supporting surfaces a multiple of times. The adhesive may be coated onto the entire surface on one side of film 32, or may be only applied at portions of or at spaced locations around the surface thereof. In any event, the portion of film 32 on which the ends 34 of antenna 30 are disposed should be coated with the adhesive to ensure secure connection with the leads 18 of IC 16 of module 10. Thus, when a plug-in sized contactless transaction module 10 is provided on a full-sized or credit card-sized carrier card 20, 20', support film 32 having antenna 30 thereon is adhered onto the carrier card 20, 20' so that the ends 34 of antenna 30 are aligned with and electrically engaged with leads 18 of IC 16. In this arrangement, the planar dimensions of film 32 may be the same as those of carrier card 20, 20' or smaller.

Although FIG. 5 only shows a single contactless transaction module 10 and a corresponding antenna 30 on the carrier card 20, carrier card 20 may be provided with two or more modules 10 with a corresponding number of antennas. The plurality of modules and antennas may be provided on both major surfaces of carrier card 20 or all on one side of card 20, depending on the sizes of the modules 10 relative to the carrier card 20. In order to provide room for a plurality of sets of transaction modules and antennas on carrier card 20, the area covered by each antenna 30 may be arranged more compactly than that shown in FIGS. 5 and 9.

In a variation of this aspect of the invention, a plurality of contactless transaction modules are provided on carrier card 20, with a single antenna, whereby the plurality of contactless transaction modules can be interchangeably positioned on the carrier card 20 to operatively align the IC leads 18 of one of the modules with the ends 34 of the antenna 30.

In a preferred embodiment of the present invention, a contactless transaction module 10 (along with an antenna 30 which is separable therefrom) is useful in conjunction with a carrier provided on the housing of a mobile telephone. In particular, a cover 50 for a mobile telephone, includes a holder for a contactless transaction module 10, and has a surface suitable for supporting an antenna in alignment with an inserted contactless transaction module 10.

Since many people today typically keep their mobile telephones close at hand and readily accessible, it would be very convenient for them to keep the plug-in sized contactless card on the housing of the mobile telephone. With this arrangement, a user only needs to wave the mobile telephone in front of the reader when necessary to use the contactless card, rather than having to rummage for the contactless transaction module in his or her wallet, purse or bag.

Figure 10:
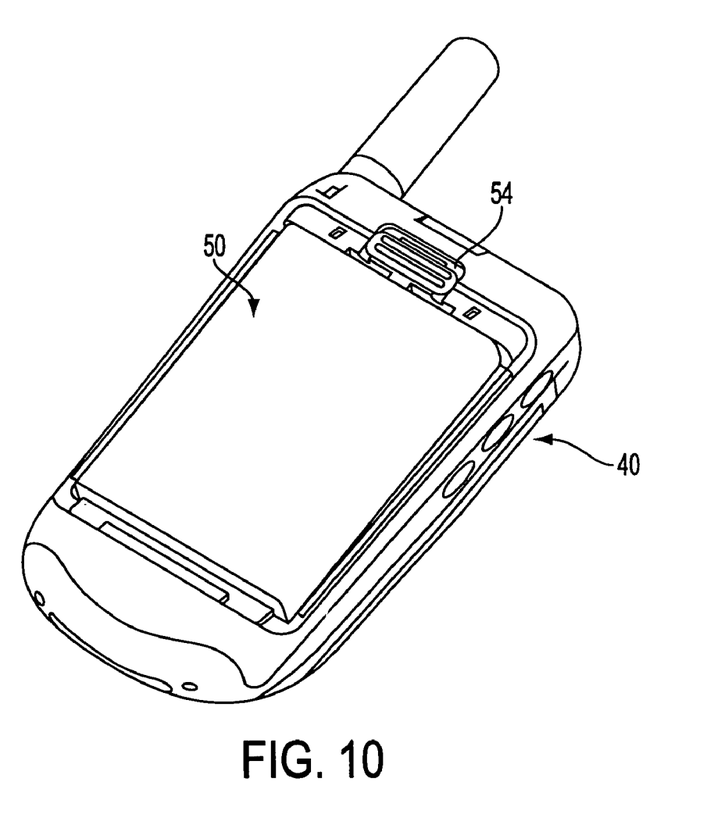
FIG. 10 illustrates an example of a carrier for the contactless transaction module attached to the exterior surface of a mobile telephone.
Figure 11:
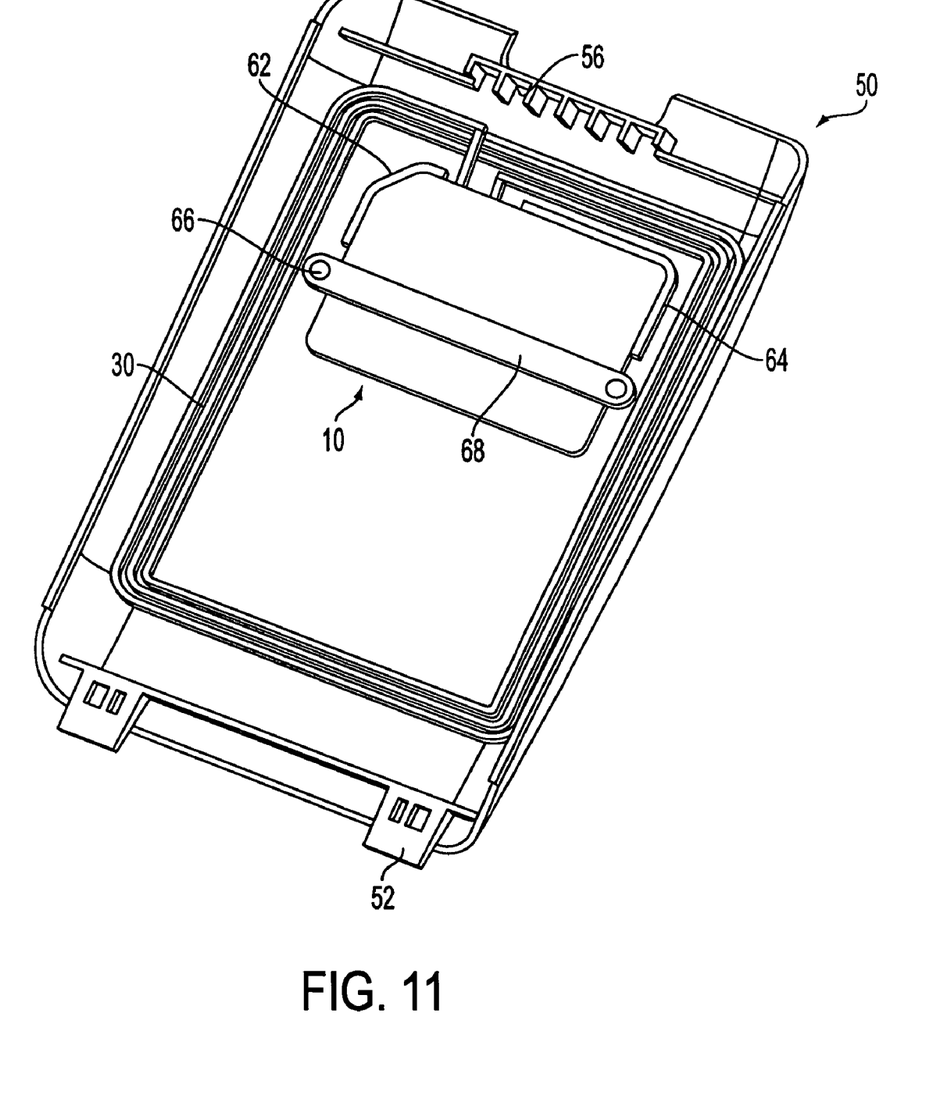
FIG. 11 illustrates a carrier for a plug-in sized contactless transaction module and having an antenna therefor provided on the surface thereof, wherein a plug-in sized contactless transaction module is inserted into the holder.
Figure 12:
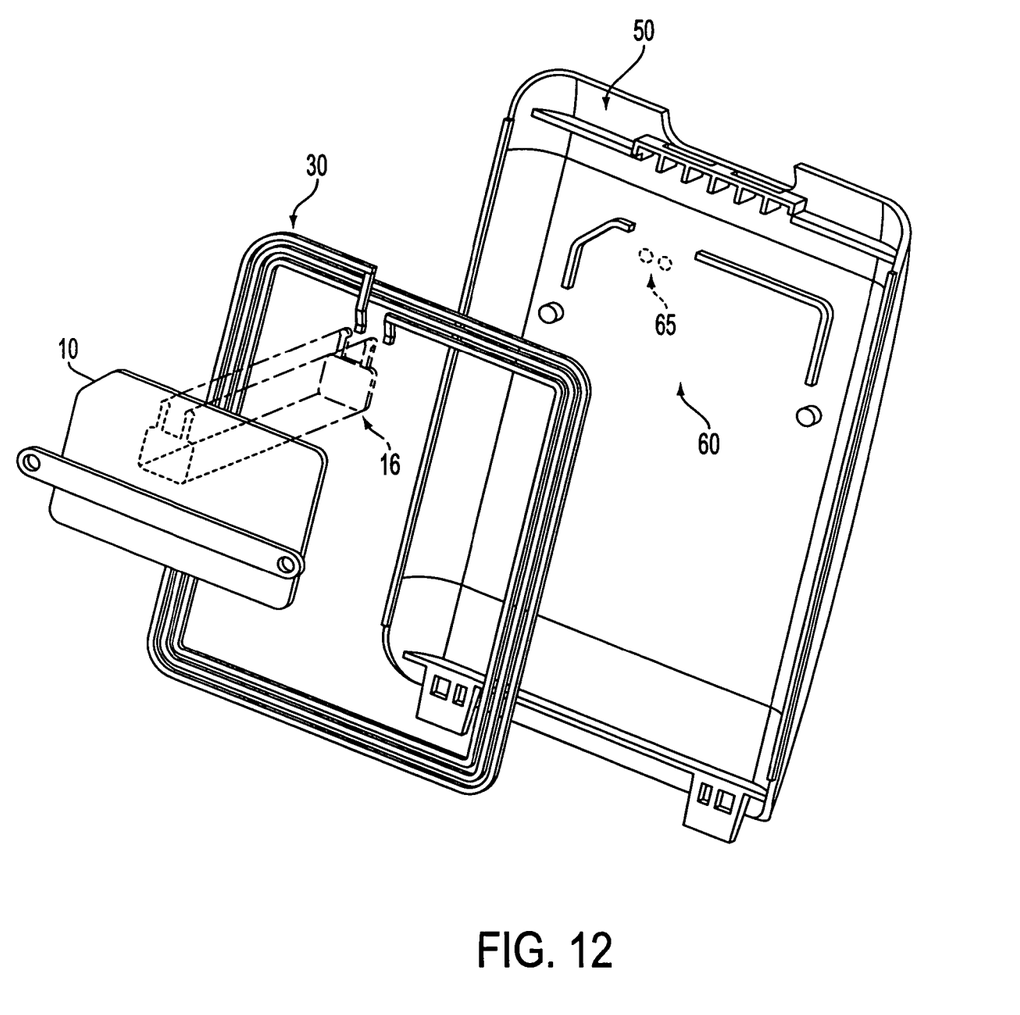
FIG. 12 is an exploded view of the carrier and plug-in sized contactless transaction module shown in FIG. 11, for illustrating the arrangement and positions of the relevant structural elements.
Figure 13:
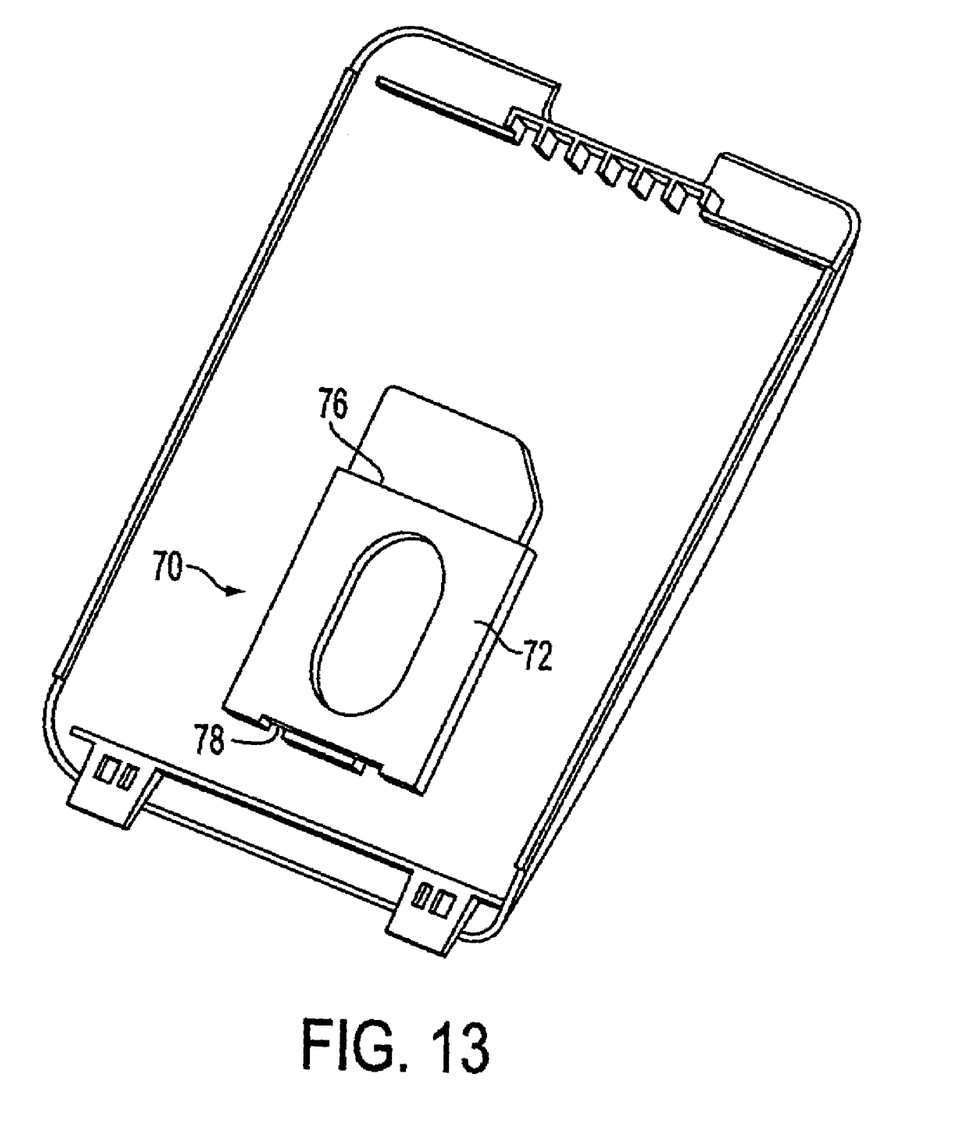
FIG. 13 illustrates an alternative holder arrangement for the plug-in sized contactless card on the surface of the carrier.

FIG. 10 shows a cover 50 in accordance with the present invention attached to a mobile telephone 40. Cover 50 defines an interior space having a thickness at least sufficient to accommodate the thickness of a contactless transaction module 10 and a holder 60 (FIG. 12) into which the contactless transaction module is inserted. As can be seen in FIGS. 11–13, cover 50 includes stationary tabs 52 formed along the bottom edge thereof for engaging with corresponding slots formed in the housing of mobile telephone 40.

As seen in FIG. 10, cover 50 is shown to be attachable to the mobile phone along the top edge of cover 50 by a latch mechanism controlled by resilient pushtab 54. For example, an upwardly-facing hook-type latch may be formed at the base of pushtab 54, wherein the latch catches under a ledge 56 formed along the inner surface at the top edge of cover 50 when the cover is attached to mobile phone 40. Alternatively, pushtab 54 and the corresponding latch may be formed on the top edge of cover 50, to catch a corresponding ledge formed on the housing of mobile phone 40.

Cover 50 can be attached to mobile phone 40 by inserting tabs 52 into the corresponding slots formed in the housing of mobile phone 40, and pressing the top edge of cover 50 against mobile phone 40 until the latch on tab 54 catches under ledge 56 on cover 50 or on the housing of mobile phone 40, depending on the configuration of the cover and phone.

Cover 50 can be detached from mobile phone 40 by pressing on pushtab 54 to release the latch from the ledge on cover 50 or on the telephone housing, whereby cover 50 can be lifted off the surface of mobile phone 40 so as to disengage tabs 52 from their respective slots in the phone housing.

The resiliency of pushtab 54 may be provided by a spring which secures the pushtab to the mobile phone housing or to cover 50, or may be provided simply by the naturally deformable characteristic of a plastic material from which the tab is formed.

Of course, cover 50 can be adapted in shape and dimensions to accommodate different styles of mobile telephones. Moreover, depending on the handset style of the mobile telephone, particularly those in which a detachable battery unit forms the back cover of the phone housing, cover 50 may be constructed as an additional cover over the battery unit. In this variation, cover 50 may optionally be formed with inwardly-facing detents or other protruding elements along the side edges of cover 50, for engaging corresponding grooves or slots formed on the battery unit or phone housing. Cover 50 may then be slid on and along the battery unit to engage and disengage cover 50 into position on the phone and to remove the same.

A first preferred embodiment of such a cover in accordance with the present invention is shown in FIGS. 11 and 12. In this embodiment, ridges 62 and 64 are formed on the interior surface of cover 50 which correspond in shape to the angled corner marking 14 of the contactless interface module 10 shown in FIG. 4A and an adjacent corner thereof. Ridges 62, 64 may have a height as great as the thickness of module 10, but may be lower. Ridges 62 and 64 serve as positioning guides to maintain the position of a contactless transaction module 10 inserted into holder 60 at a predefined location relative to cover 12.

A retaining strip 68 is affixed to the interior surface of cover 12 by posts 66 and spans from the vicinity of the end of ridge 62 to the vicinity of the end of ridge 64, across the space substantially encompassed between ridges 62 and 64. The length of retaining strip 68 is at least equal to the corresponding length or width dimension of module 10. The surface of retaining strip 68 facing the interior surface of cover 50 is preferably situated at a height which is very slightly less than the thickness of module 10, to provide tension against module 10 when inserted into holder 60, but not at a height so low as to prevent insertion of module 10 into holder 60. Retaining strip 68 serves to securely hold module 10 in place against ridges 62 and 64 when the card is inserted into holder 60.

Ridges 62 and 64, posts 66, and retaining strip 68 are preferably constructed of the same materials used to form the interior surface of cover 50. Alternatively, retaining strip 68 may be made of a material having elasticity to enhance its retaining function.

In this case in which the contactless transaction module 10 is sized and shaped like a plug-in sized SIM card, the module 10 is inserted into holder 60 at an orientation such that the angled corner 14 is aligned with the position of ridge 62, and then sliding the module 10 under retaining strip 68 until the inserted corners of the module abut ridges 62 and 64, as shown in FIG. 11. Of course, the orientation of holder 60 can be varied so that the angled corner of the inserted module 10 is positioned to the upper right side of the cover as opposed to the upper left side as illustrated in FIGS. 11 and 12, or so that the angled corner is positioned at the lower left or lower right corner of the holder, wherein the module 10 is inserted from above the retaining strip 68 as seen in the drawings. Alternatively, ridge 64 can be designed to conform to the corner adjacent the angled corner of a plug-in sized contactless transaction module 10 in the short dimension as opposed to the long dimension. Similarly, ridge 62 can be positioned to orient the angled corner marking at the upper left, upper right, lower left, or lower right corner of holder 60.

Of course, if the size and shape of contactless transaction module 10 is formed to be different from that of a plug-in sized SIM card and as illustrated in the drawings, holder 60 in cover 50, specifically ridges 62 and 64, should be correspondingly shaped to conform to the size and shape of the module 10.

In view of the various possible orientations and configurations of contactless transaction module 10 in holder 60, ridges 62 and 64 should be configured so that when a contactless transaction module 10 is inserted in holder 60, leads 18 of IC 16 on contactless transaction module 10 will be placed in the appropriate position facing the interior surface of cover 50 to become aligned with antenna ends 34 of antenna 30 provided on the surface of cover 50, as seen in FIG. 12 and as will be described below.

In this embodiment, film 20 containing antenna 30, upon being peeled/removed from carrier card 20, may be adhered onto the interiorly facing surface of cover 50 by a user, taking care to place antenna ends 34 at a marked location 65 on the surface of cover 50 (FIG. 12). The marked location 65 indicates the specific position on the cover 50 at which the antenna ends should be placed to be aligned with and establish proper connection with a contactless card inserted into the holder 60. The marked location 65 may be formed as an embossed or debossed region on the surface of cover 50, or may be indicated with any other type of surface marking.

Alternatively, cover 50 may be provided with an antenna 30 already "built-in" on the surface of the cover 50, with the antenna ends 34 being provided at a location such that they would naturally line up with the leads 18 of the IC 16 on the contactless transaction module 10 when subsequently inserted into holder 60. In this variation, the antenna ends 34 can be provided either on the interior surface of cover 12 or on the surface of the retaining strip 68 which faces an inserted module 10.

A second preferred embodiment of a carrier for a contactless transaction module according to the present invention is shown in FIG. 13. In this embodiment, a holder for a contactless transaction module is formed as a pocket 70 on the interior surface of cover 50. Pocket 70 is formed by an envelope 72 securely attached to the interior surface of cover 50, and is sealed or has a barrier along three of the four sides to prevent a contactless transaction module 10 inserted therein from sliding out. The width of envelope 72 is sized to snugly accommodate the contactless transaction module 10 therein, and the height thereof is preferably less than that of the module 10.

Envelope 72 also includes a window 74 large enough to enable the user to push an inserted module out of pocket 70 with his or her finger. Pocket 70 is positioned on the interior surface of cover 50 with its bottom end 78 close to one edge of cover 50 and pocket opening 76 positioned more towards the center of cover 50, relative to bottom end 78. To insert the module 10, the module is laid against the interior surface of the cover 50 above the pocket opening 76 and slid into pocket 60.

Here, it is important that the contactless transaction module 10 be inserted so that the side containing the IC is facing the surface of cover 50, so that the antenna leads 18 on contactless transaction module 10 line up with the antenna ends 34 of antenna 30 provided on cover 50. Also, since the pocket 70 is fixed on the surface of cover 50, it is preferred that this embodiment is provided to the user with the antenna permanently affixed on the surface of the cover, with ends 34 of antenna 30 located at the appropriate location to be aligned with leads 18 of IC 16 when the contactless transaction module 10 is inserted into pocket 70. However, if the depth and configuration of pocket 70 permits, it may be possible to omit the permanently affixed antenna so that a user can adhere a detachable antenna, such as the antenna 30 supported on a film 32 as shown in FIG. 9 and described above, onto the cover 50 in a designated orientation for operatively aligning the antenna and a contactless transaction module inserted into the holder.

Carriers for the contactless transaction modules according to the present invention may be embodied in alternative forms other than as a cover for a mobile telephone. For example, such carriers may be formed as a cover or an accessory for a laptop or notebook computer, a palmtop or handheld organizer or computing device such as a personal digital assistant, or any other type of portable electronic and/or communication device. Such carriers may be embodied in any form which may be convenient to a mobile user, so long as the carrier includes a holder for a contactless transaction module and a suitable surface for adhering the film 32 containing an antenna 30 or an antenna already provided in or on the carrier for being aligned with a contactless transaction module inserted into the holder.

Also, depending on the relative sized of the contactless transaction module and the carrier, a plurality of holders can be provided on the carrier. In this variation of the invention, designated regions are provided on the interior surface of the cover on which a corresponding antenna is permanently affixed or can be detachably affixed by a user for each contactless transaction module placeable in the cover or accessory. As such, each contactless transaction module can be operatively connected to a respective antenna when placed into one of the plurality of holders.

Alternatively, the carrier can be constructed to accommodate a plurality of contactless transaction modules and a single antenna, wherein only one holder enables and operative connection with the antenna and the other holder(s) provide merely passive storage of the contactless transaction modules inserted therein. To enable contactless operation of a module inserted into one of the non-active holders, therefore, the user would have to interchange the positions of the module desired to be activated and the module occupying the active holder.

Similarly in this regard, if the holder(s) are configured to accommodate a contactless transaction module having a size and shape corresponding to that of a plug-in sized SIM card, any of the holder(s) in the carrier can be used as a passive holder for a storing plug-in sized SIM card(s). When the carrier is formed as a cover for a mobile phone, the advantage provided this aspect of the invention is particularly useful in Europe or Asia where a user often carries more than one plug-in sized SIM card for use in the mobile phone.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A carrier for a contactless transaction card assembly, comprising:
   a support device;
   a plurality of contactless transaction card holders; and
   an antenna for transmitting information in the form of electromagnetic signals between an integrated circuit chip capable of receiving and transmitting information via electromagnetic transmission on a contactless transaction card and a transaction reader, the antenna being mounted on the support device and having predetermined contact points which are located so as to become aligned with and electrically engaged with an integrated circuit chip of a contactless transaction card inserted into one of the plurality of holders to thereby enable electromagnetic transmission of information to and from the integrated circuit chip.

2. A carrier for a contactless transaction card assembly, comprising:
   a support device;
   a plurality of contactless transaction card holders; and
   a plurality of antennas corresponding in number to the number of contactless transaction card holders and located so that when a contactless transaction card is inserted into each respective holder, an integrated circuit chip of each respective inserted contactless transaction card becomes aligned with and electrically engaged with the predetermined contact points of a corresponding antenna to thereby enable electromagnetic transmission of information to and from the respective integrated circuit chip.

3. A carrier for a plug-in sized contactless integrated circuit card, comprising:
   a support device;
   at least one holder for a contactless transaction card provided on a surface of the support device; and an indicator on the support device for indicating an proper position at which predetermined contact points of an antenna is to be placed, such that when an antenna is placed at the proper position, such predetermined contact points of the antenna will be located so as to become aligned with an integrated circuit chip capable of receiving and transmitting information via electromagnetic transmission of a contactless transaction card inserted into the holder to thereby enable transmission of information in the form of electromagnetic signals between the contactless transaction card placed in the holder and a transaction reader.

4. The carrier according to claim 3, wherein the support device is an accessory or a cover for a portable electronic and/or communication device.

5. The carrier according to claim 4, wherein the support device is a cover which fits over the housing of a mobile telephone or a battery pack thereof.

6. The carrier according to claim 4, wherein the support device is an accessory or a cover for a laptop or notebook computer.

7. The carrier according to claim 4, wherein the support device is an accessory or a cover for a handheld or palmtop computer.

8. The carrier according to claim 3, wherein the support device is a carrier card.

9. The carrier according to claim 3, wherein the holder is configured to accommodate a contactless transaction card, the contactless transaction card having a size and shape similar to a standard plug-in sized SIM card.

10. The carrier according to claim 3, wherein the at least one holder is a plurality of contactless transaction card holders, wherein one of the holders is located so that when an antenna is placed at the indicated position and a contactless transaction card is inserted into that one holder, an integrated circuit chip of the inserted contactless transaction card becomes aligned with and electrically engaged with the predetermined contact points of the antenna to thereby enable electromagnetic transmission of information to and from the integrated circuit chip.

11. The carrier according to claim 3, wherein the at least one holder is a plurality of contactless transaction card holders, the carrier further comprising a plurality of indicators on the support device for indicating respectively proper positions at which predetermined contact points of a corresponding number of antenna are to be placed, the number of indicator locations corresponding in number to the number of contactless transaction card holders, the indicators being located so that when a respective antenna is placed at each indicated position and a contactless transaction card is inserted into each corresponding holder, an integrated circuit chip of each respective inserted contactless transaction card becomes aligned with and electrically engaged with the predetermined contact points of a corresponding antenna to thereby enable electromagnetic transmission of information to and from the respective integrated circuit chip.

12. A contactless transaction card assembly comprising:
   a carrier card;
   a plurality of contactless transaction card modules mounted on the carrier card, each contactless transaction card module including a module body and an integrated circuit provided on the module body; and
   an antenna unit operatively but separably aligned with the integrated circuit of only one of the plurality of contactless transaction card modules at a time, and wherein the plurality of contactless transaction card modules are interchangeably connectable to the antenna of the antenna unit.

13. A contactless transaction card assembly comprising:
   a carrier card;
   a plurality of contactless transaction card modules mounted on the carrier card, each contactless transaction card module including a module body and a contactless transaction integrated circuit provided on the module body; and
   a plurality of antenna units corresponding in number to the number of contactless transaction card modules, such that the antenna of each antenna unit is operatively but separably aligned with the integrated circuit of a corresponding one of the plurality of contactless transaction card modules.

* * * * *